(12) United States Patent
DeMartini et al.

(10) Patent No.: US 8,904,545 B2
(45) Date of Patent: Dec. 2, 2014

(54) METHOD, SYSTEM, AND DEVICE FOR VERIFYING AUTHORIZED ISSUANCE OF A RIGHTS EXPRESSION

(71) Applicant: ContentGuard Holdings, Inc., Plano, TX (US)

(72) Inventors: Thomas DeMartini, Culver City, CA (US); Charles P. Gilliam, Darien, CT (US); Eddie J. Chen, Rancho Palos Verdes, CA (US)

(73) Assignee: ContentGuard Holdings, Inc., Plano, TX (US)

( * ) Notice: Subject to any disclaimer, the term of this patent is extended or adjusted under 35 U.S.C. 154(b) by 0 days.

(21) Appl. No.: 14/223,948

(22) Filed: Mar. 24, 2014

(65) Prior Publication Data
US 2014/0289871 A1 Sep. 25, 2014

Related U.S. Application Data

(63) Continuation of application No. 10/986,308, filed on Nov. 12, 2004, now abandoned.

(51) Int. Cl.
*G06F 7/04* (2006.01)
*G06Q 50/18* (2012.01)
*H04L 29/06* (2006.01)

(52) U.S. Cl.
CPC .............. *H04L 63/10* (2013.01); *G06Q 50/184* (2013.01)
USPC .......................................................... 726/26

(58) Field of Classification Search
CPC .............. G06F 21/10; G11B 20/00086; G11B 20/0021
USPC .......................................................... 726/26
See application file for complete search history.

(56) References Cited

U.S. PATENT DOCUMENTS

| 5,138,712 | A | * | 8/1992 | Corbin ........................... 726/30 |
| 5,390,297 | A | * | 2/1995 | Barber et al. ..................... 726/29 |
| 2004/0003251 | A1 | * | 1/2004 | Narin et al. .................... 713/172 |
| 2004/0039916 | A1 | * | 2/2004 | Aldis et al. ..................... 713/177 |
| 2005/0081037 | A1 | * | 4/2005 | Kumagai et al. ............... 713/175 |

OTHER PUBLICATIONS

PDF Reference (Second Edition), Adobe Portable Document Format, Version 1.3, Adobe Systems Incorporated, 1985-2000, Addison-Wesley.
Adobe Acrobat 2.0, Information Products Group, Adobe Systems Incorporated, 1994.

* cited by examiner

*Primary Examiner* — Teshome Hailu
(74) *Attorney, Agent, or Firm* — Stephen M. Hertzler; Marc S. Kaufman; Reed Smith LLP (57) ABSTRACT

A method, system, and device for verifying authorized issuance of a statement or expression, including determining if a statement or expression is associated with a statement of trusted issuance; determining if the statement of trusted issuance applies; determining if issuance of the statement of trusted issuance is authorized; and verifying that the issuance of the statement or expression was authorized, if the statement of trusted issuance applies, and the issuance of the statement of trusted issuance is authorized.

18 Claims, 6 Drawing Sheets

METHOD, SYSTEM, AND DEVICE FOR VERIFYING AUTHORIZED ISSUANCE OF A RIGHTS EXPRESSION

RELATED APPLICATION DATA

This application claims priority to U.S. patent application Ser. No. 10/986,308, filed Nov. 12, 2004, the disclosure of which is hereby incorporated by reference in its entirety.

BACKGROUND OF THE INVENTION

1. Field of the Invention

The present invention generally relates to the field of processing statements and expressions, including rights expressions, and more particularly to a method, system, and device for determining authorization of rights expressions with respect to a trust root.

2. Discussion of the Background

The digital age has greatly increased concerns and capabilities about ownership, access, and control of copyrighted information, restricted services and valuable resources, as well as electronic communications through e-mail, by way of the internet and other means, and electronic transactions, such as electronic or automated purchase and sale of goods and services. Rapid evolution and wide deployment has occurred for computers, and other electronic devices, such as cellular phones, pagers, PDAs, pocket PCs, music players, and e-book readers, and these devices are interconnected through communication links, including the Internet, intranets, and other networks. These interconnected devices are especially conducive to publication of content, offering of services, and availability of resources electronically.

One of the difficulties facing the widespread distribution of digital works (e.g., documents or other content in forms readable by computers), via electronic means, and the Internet in particular, is the enforceability of the intellectual property rights of content owners during the distribution and use of digital works. One of the difficulties facing digital commerce, including the distribution and use of goods and services, is the ability to securely and effectively process electronic transactions and, in particular, to do so in accordance with the requirements of the parties involved in the transaction.

Efforts to resolve these difficulties have been termed "Intellectual Property Rights Management" ("IPRM"), "Digital Property Rights Management" ("DPRM"), "Intellectual Property Management" ("IPM"), "Rights Management" ("RM"), and "Electronic Copyright Management" ("ECM"), collectively referred to as "Digital Rights Management (DRM)" herein. There are a number of issues to be considered in effecting a DRM System, such as authentication, authorization, accounting, payment and financial clearing, rights specification, rights verification, rights enforcement, and document protection. U.S. Pat. Nos. 5,530,235, 5,634,012, 5,715,403, 5,638,443, and 5,629,980, the disclosures of which are incorporated herein by reference, address such issues.

In a simple DRM system for managing the distribution and use of digital works, one agent issues a rights expression to another agent, which processes the rights expression, and recognizing the first agent as authorized, acts upon that rights expression. In this simple model, the recognition of the first agent by the second is innate or hard-coded. As a DRM system evolves, more and more agents wish to issue rights expressions and use the DRM system for their assets. With the addition of these new rights expression issuing agents, a solution other than innate or hard-coded recognition of agents issuing rights expressions becomes desirable.

One such approach is the use of certificates to certify agents issuing rights expressions. Such certificates then are used by other agents to recognize the certified agents. In this approach, one certified agent issues a rights expression to another agent, which then processes the rights expression, verifies the certificates associated with the first (certified) agent, treats the first (certified) agent as authorized, if it recognizes the trust root of the certificate chain, and then acts upon that rights expression. Certificate languages, such as X.509 and SPKI, allow only relatively simple conditions, primarily validity time intervals, in each certificate. Accordingly, the most common certificate chain verification algorithms for these languages (e.g., Internet Engineering Task Force (IETF) RFC 2459, and RFC 2693, respectively) are relatively straight-forward to execute.

As a DRM system continues to evolve and more and more agents become certified to issue rights expressions, eventually concerns may arise about one certified agent issuing rights expressions, either intentionally or accidentally, over another certified agent's assets, thus leading to the compromise of that asset. One approach that can be taken to address this concern is described in detail in the OMA DRM 2.0 Specifications issued by the Open Mobile Alliance, an industry consortium whose mission is to facilitate global user adoption of mobile data services. The OMA specifications involve requiring each certified agent to know the content encryption key for each asset for which it issues rights expressions.

Another approach is to scope (e.g., limit) each agent's certification to issue rights expressions to apply only to the assets it owns or controls. Determining the correct scope for each certificate takes some work, but is doable. The expression of such scoping can be accomplished using, for example, techniques described in U.S. patent application Ser. No. 10/162,701 to Xin, et al., entitled "METHOD AND APPARATUS MANAGING THE TRANSFER OF RIGHTS" and U.S. patent application Ser. No. 10/298,872 to Atkinson, et al., entitled "DIGITAL LICENSES THAT INCLUDE UNIVERSALLY QUANTIFIED VARIABLES," and a rights expression language, such as ODRL, XrML or as adopted by the Moving Picture Experts Group (MPEG) as an international standard (ISO/IEC 21000-5) known as the ISO MPEG REL. Such an approach also can involve a more sophisticated chain verification algorithm to verify the scope in each certificate, for example, as described in U.S. patent application Ser. No. 10/856,865 to Lao, et al., entitled "NETWORKED SERVICES LICENSING SYSTEM AND METHOD," although execution of such algorithm is still relatively straightforward, as long as the conditions in each certificate remain relatively simple.

At this stage of DRM evolution, the technology includes approaches (other than innate or hard-coded) for verifying the authorized issuance of a rights expression, such as 1) unscoped certificates with the issuance of rights expressions requiring knowing the content encryption key, and 2) scoped certificates.

As DRM business models continue to evolve, users should become more interested in the independent trade of rights (independent from the trade of the underlying assets). A person should be able to trade any rights in any territory or field for any digital work or service. For example, a person should be able to trade rights to a suite of web services or to view in the United States all current and future publications of a particular publisher on a particular topic. In such cases, requiring knowledge of the appropriate content encryption key for each trade becomes limiting, because there is not a clear mapping from a rights expression to a single asset being traded. In this respect, the scoped certificates approach is advantageous because it does not limit the issuing of potentially overbroad rights expressions and instead limits the certificates' effect, as part of the chain verification algorithm.

For example, a scoped certificate might say that agent Publisher 1 may issue rights expressions pertaining to paperback Book 1. Publisher 1 might actually issue a rights expression to agent Consumer 1, allowing Consumer 1 to view any paperback book. When these two rights expressions are put together and the chain verification algorithm is executed, Consumer 1 only will be able to view paperback Book 1. However, if another scoped certificate is later added that says that Publisher 1 may also issue rights expressions pertaining to paperback Book 2, then by putting all the rights expressions together, Consumer 1 will be able to view both paperback Book 1 and paperback Book 2 (since Publisher 1 said Consumer 1 could view any paperback book and since Publisher 1's issuing ability is scoped to paperback Book 1 and paperback Book 2).

As the business of trade in rights continues to expand, publishers may wish to engage retailers and other value-add providers in the rights expression chain between the publisher and the consumers. Moreover, publishers may wish to scope the rights-issuing capabilities of various retailers or other intermediaries in various ways, such as to certain territories or by requiring the payment of particular fees or by imposing other conditions on authorization to issue rights expressions. The types of conditions in the rights expressions that form the certificate chain can become very creative and complex, and the execution of the chain verification algorithm for such a chain becomes less straight-forward. Accordingly, there is a need to make the execution of this process more straight-forward, without sacrificing business model flexibility, technical features or security.

One of the potential difficulties in verifying a certificate chain, including creative conditions, is the information needed to execute the verification typically is not available. For example, consider a scenario including three agents, an author, a reader, and a friend. There is one rights expression that allows the author to issue rights expressions pertaining to his book. There is another rights expression from the author to the reader, allowing the reader to read the book, and issue up to two rights expressions, one each to two of his friends. There is a third rights expression from the reader to his friend, allowing his friend to view the book. When the friend wants to view the book, he will verify the certificate chain, including the rights expressions, and at some point will have to determine if the reader has satisfied the condition of issuing only up to two rights expressions. A problem thus arises if for any reason the information is not available (e.g., the reader might not have kept all required information or might have discontinued providing information in an accessible format). If, however, the reader does keep track of this information, he might not be available for contact by the friend. The reader also might have stored this information at some place that is available for contact, but that place may have a privacy policy or technology limitation, which prohibits or prevents it from sharing that information with the friend.

One possibility is that the information about the number of rights expressions the reader has so far issued is stored in the rights expression that the friend receives. Assuming the friend has access to this information somehow, the friend still has to validate the "at most two rights expressions" condition using the information. However, this means that the friend has to understand what the condition means. In some situations, the friend may be using outdated software or hardware, and may not be able to support all the latest conditions being used by the author and the reader. This means that the author and reader cannot upgrade the conditions they use, unless the friend also updates the conditions it can understand. One solution to this, is to store the information about satisfaction of conditions in a way that the friend can process that information, without having detailed knowledge of the condition (e.g., by comparing the names of satisfied conditions with the names of conditions that need to be satisfied).

However, there is a further issue where the friend has access to the information about and names of the conditions under which the reader can issue rights expressions, because in some situations it is not desirable to share the information, such as where the information is considered confidential. For example, if there is a fee associated with the reader giving his friend a rights expression as a gift, the reader may not wish his friend to know the price of the gift. To solve this concern, the condition information might be encrypted so that the friend cannot discern it, but the friend's software or hardware can process it. This extra encryption, however, also complicates the system design to some degree. In situations where knowledge of the details of the conditions is more sensitive than the actual assets themselves, the cost of the encryption needed on the conditions could be disproportionate to the asset's value.

SUMMARY OF THE INVENTION

Therefore, there is a need for a method and system that addresses the above and other problems, so as to enable the more advanced DRM features that users want, while maintaining security, and not incurring disproportionate costs or burdens in a rights expression chain verification algorithm. The above and other needs are addressed by the exemplary embodiments of the present invention, which provide a method, system, and device for use in connection with the use and distribution of digital works, restricted services, and valuable resources.

Accordingly, in exemplary aspects of the present invention, a method, system, and device for verifying authorized issuance of a statement or expression are provided, including determining if a statement or expression is associated with a statement of trusted issuance; determining if the statement of trusted issuance applies; determining if issuance of the statement of trusted issuance is authorized; and verifying that the issuance of the statement or expression was authorized, if the statement of trusted issuance applies, and the issuance of the statement of trusted issuance is authorized.

Still other aspects, features, and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION OF THE PREFERRED EMBODIMENTS

The exemplary embodiments include a statement of trusted issuance, which is a statement including a claim that an issuance was authorized according to some trust root or rights expression. A statement of trusted issuance can be issued by an agent who is able to verify a statement or expression, including rights expression, and including a statement or expression chain (or a part of a chain) and can be relied on by other agents who might be unable or less able to perform such verification.

Figure 1:
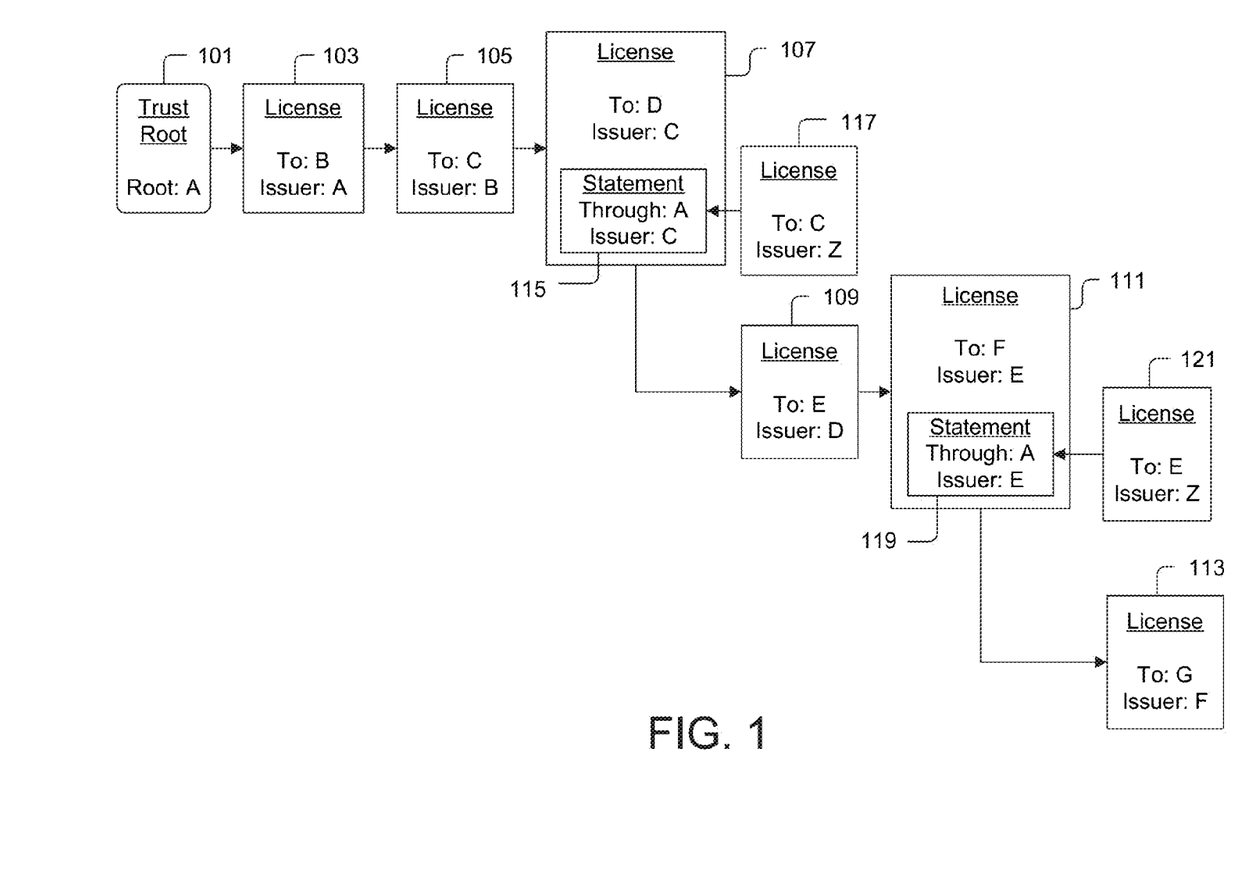
FIG. 1 shows a rights derivation scenario with a trust root, six derived rights expressions, and two statements of trusted issuance.

FIG. 1 shows a trust root 101, and six rights expressions, 103, 105, 107, 109, 111, and 113. The rights expression 103 is derived from the trust root 101, and is issued by agent A to agent B. No statement of trusted issuance is included in the rights expression 103. The rights expression 105 is derived from the rights expression 103, and is issued by agent B to agent C. No statement of trusted issuance is included in the rights expression 105. The rights expression 107 is derived from the rights expression 105, and is issued by agent C to agent D. The rights expression 107 includes a statement of trusted issuance 115 rooted with agent A. When using rights expression 107, the statement of trusted issuance 115 can be used in conjunction with rights expression 117 to verify that rights expression 107 was issued correctly with respect to the trust root 101, without tracing through rights expressions 105 and 103, if agent Z is considered to be trusted. The exemplary embodiment of FIG. 1, as well as the other exemplary embodiments, also applies to statements or expressions, other than rights expressions.

An exemplary XML representation of statement of trusted issuance 115 is further described herein. Agent A, in statement of trusted issuance 115, is represented in the exemplary XML representation using RSA public key information. The issuer field in statement of trusted issuance 115 is omitted from the exemplary XML representation, because it is to be inherited from the rights expression, which includes the statement of trusted issuance.

The exemplary embodiments include subsequent derivative statements or expressions, including rights expressions. For example, the rights expression 109 is derived from the rights expression 107, and is issued by agent D to agent E. Because rights expression 109 has no statement of trusted issuance, when using rights expression 109, the conditions of the derivation of rights expression 109 from rights expression 107 must be re-verified to establish the authorized issuance of rights expression 109. Further verification of the conditions of the derivation of rights expression 107 from rights expression 105 is not needed, because rights expression 107 includes statement of trusted issuance 115 that can be utilized, as previously described, when agent Z is considered to be trusted by agent E.

If another rights expression 111 is derived from rights expression 109, and agent E is authorized to make statements of trusted issuance, as represented in rights expression 121, agent E can include, for example, the statement of trusted issuance 119 rooted with agent A inside rights expression 111. When agent F uses rights expression 111 to, for example, play a media file or derive another rights expression 113, the statement of trusted issuance 119 can be used in conjunction with rights expression 121 to verify that rights expression 111 was issued correctly with respect to the trust root 101, without tracing through rights expressions 109, 107, 105, and 103.

Figure 2:
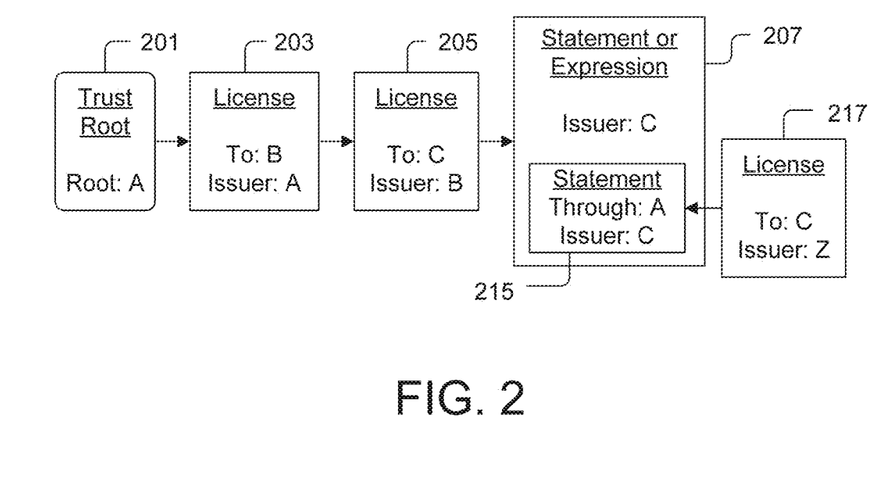
FIG. 2 shows a rights derivation scenario with a trust root, two derived rights expressions, a derived statement or expression, and a statement of trusted issuance.

FIG. 2 shows a rights derivation scenario similar to the one shown in FIG. 1, except that rights expression 107 is replaced with statement or expression 207, which is not necessarily a rights expression. Statement or expression 207 could be any statement or expression. For example, statement or expression 207 could express that Agent C claims that pigs flew yesterday, that pigs will fly tomorrow, that contractual obligations were fulfilled, that an entity is certified for certain qualification, such as retailer for branded goods or Microsoft certified engineer, or that a purchase was made. Statement of trusted issuance 215, and second rights expression 217 can be used to determine that the issuance by Agent C of statement or expression 207 was authorized, based on trust root 201, in the same way that statement of trusted issuance 115 and second rights expression 117 were used to determine that the issuance by Agent C of rights expression 107 was authorized, based on trust root 101.

Figure 3:
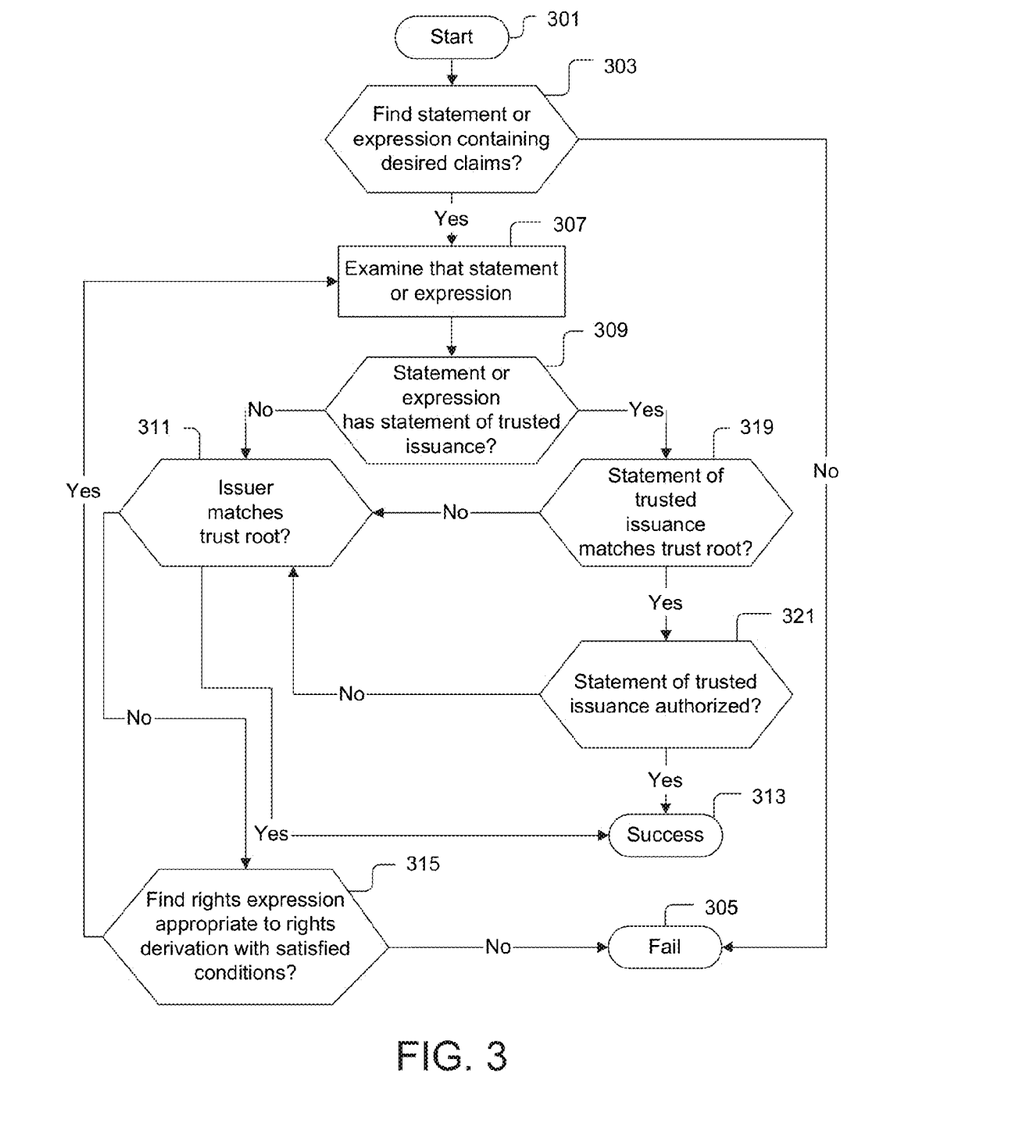
FIG. 3 shows a procedure using statements of trusted issuance for verifying the authorized issuance of a rights expression.

An exemplary procedure for verifying the authorized issuance of a statement or expression, such as a rights expression, is shown in FIG. 3. The process starts at step 301, and at step 303 an attempt is made to find a statement or expression, including some desired claims, for example, when attempting to find a rights expression, such as usage rights to a media file. If no suitable statement or expression can be found (e.g., no rights are granted for that file or some conditions for the rights that have been granted are not met, such as time expired, fee not paid, too early to view) the process terminates in failure at step 305. If, however, a suitable statement or expression is found, it is examined at step 307. At step 309, if the statement or expression does not include a statement of trusted issuance, the process continues at step 311, follows a sub-process to be described in more detail, and terminates in either success at step 313 or failure at step 305 or processing returns to step 307. Specifically, if the issuer of the statement or expression matches the trust root at step 311, the process terminates in success at step 313. Otherwise, if the rights expression from which the examined statement or expression was derived (and for which all conditions were satisfied at the time of derivation) can be found (possibly with the help of additional entities) in step 315, the process returns to step 307 using that new rights expression. Otherwise, the process terminates in failure at step 305.

In the case that step 309 finds that the statement or expression includes a statement of trusted issuance, step 319 determines if the statement of trusted issuance matches the trust root. If so, step 321 determines if the statement of trusted issuance is authorized. This determination can be made by a variety of means, for example, by innate knowledge or by recursively employing the process shown in FIG. 3. If step 321 determines the statement of trusted issuance is authorized, the process terminates in success at step 313, advantageously, in many cases, either faster than it would have terminated in success at step 313 resulting from step 311 or more desirable than it would have terminated in failure at step 305. If either of the determinations in steps 319 or 321 is negative, the process continues at step 311.

Figure 4:
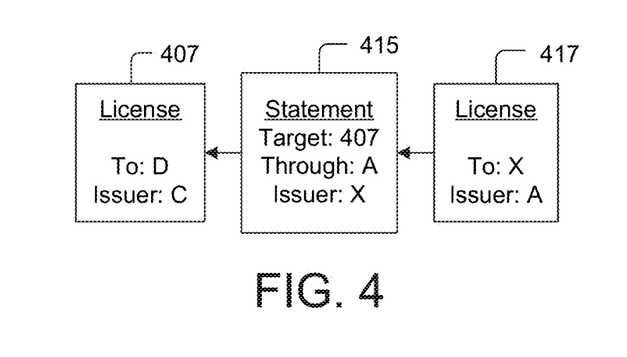
FIG. 4 shows an alternative configuration of rights expressions and statements of trusted issuance from that shown in FIG. 1.

FIG. 4 shows items 407, 415, and 417 representing an alternate configuration of items 107, 115, and 117 of FIG. 1, respectively. For example, statement of trusted issuance 415, applying to rights expression 407, does not appear inside rights expression 407. Instead, some other means is used to link the two. While the issuers of rights expression 107 and statement of trusted issuance 115 are the same, the issuer of rights expression 407 is different from the issuer of statement of trusted issuance 415. While rights expression 117, authorizing the issuance of statement of trusted issuance 115, is issued by a third party, rights expression 417, authorizing the issuance of statement of trusted issuance 415, is issued by the same agent through which the statement of trusted issuance claims issuance should be trusted. The exemplary embodiments include other forms of configurations and variations, wherein the exemplary process shown in FIG. 3 still applies thereto.

Figure 5:
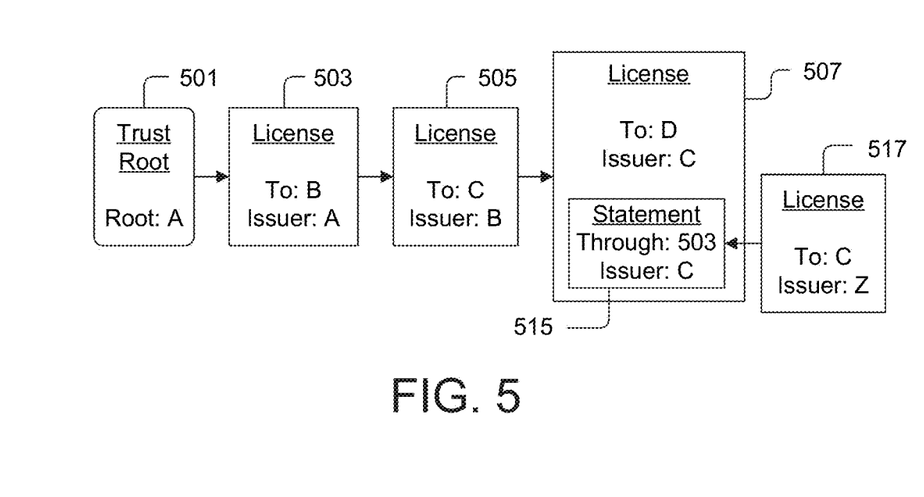
FIG. 5 shows alternative contents of a statement of trusted issuance from that shown in FIG. 1.

While the exemplary embodiments include the trust root in the statement of trusted issuance, further exemplary embodiments include alternative contents in the statement of trusted issuance. For example, as shown in FIG. 5, statement of trusted issuance 515 includes an indication that authorized issuance has been verified through rights expression 503. Assuming agent Z is trusted, agent D can use rights expression 507 and included statement of trusted issuance 515, and second rights expression 517 to determine that the authorization to issue rights expression 507 traces back to rights expression 503. Agent D then can continue the chain verification process independently to determine whether the issuance of rights expression 503 was authorized, based on trust root 501.

By employing the exemplary embodiments, it is possible to implement many of the desired features in Digital Rights Management (DRM), while lowering costs. For example, consider a scenario, including of four agents representing a publisher A, a distributor B, a retailer C, and a consumer D. The publisher A might issue a rights expression 103 to distributor B to distribute all of the publisher's paperback books in the United States and Canada. Distributor B then may issue a rights expression 105 to retailer C to retail paperbacks from that publisher in the United States and Canada for a publisher price of $2 each. After consumer D pays retailer C $5, retailer C then may issue a rights expression 107 to consumer D to read a paperback Book 1. When retailer C issues rights expression 107, retailer C checks the rights expression chain to verify that all conditions on all parties have been fulfilled, including that distributor B distributed paperbacks, that distributor B distributed them within the United States and Canada, and that $2 of the $5 the consumer paid went to publisher A. Because retailer C has verified the authorized issuance of rights expression 107, based on publisher A as the trust root, retailer C inserts statement of trusted issuance 115 into rights expression 107 on issuance. Consumer D now is able to determine if he is permitted to play paperback Book 1, by looking at just a few rights expressions, including one that says that publisher A is the trust root for Book 1, rights expression 107 that says that retailer C says consumer D may play paperback Book 1 and includes a statement of trusted issuance rooted with publisher A, and rights expression 117 that says that retailer C can issue statements of trusted issuance rooted with publisher A.

Even though consumer D may know that the distribution occurred in the United States in paperback form, consumer D is not required to have access to any information about where the distribution occurred, in what form, how much of his money was paid to the publisher or the like. Moreover, consumer D does not have to know what the actual possibilities and conditions of distribution were (e.g., that the book could also have been distributed in Canada, but that hardback books could not have been distributed and that $2 must have been paid to the publisher).

Because consumer D does not have to know such details, it is also possible for publisher A, distributor B, and retailer C to change their software or hardware to support additional creative conditions without impacting or having to worry about the impact on consumer D. Since consumer D does not have to have access to rights expression 103 or 105, it is also not necessary to incur the expense of encrypting or otherwise protecting these rights expressions or making sure that consumer D has secure software or hardware to decrypt and access the rights expressions. Advantageously, by using the statement of trusted issuance, the task of verifying the authorized issuance of a rights expression with respect to a trust root becomes much more straightforward for consumer D.

An issue, however, is the possibility that someone may erroneously or improperly insert a statement of trusted issuance. For example, retailer C who inserted a statement of trusted issuance was supposed to have verified the authorized issuance of rights expression 107 based on publisher A as the trust root, but it may have failed to do so, or, for example, it may have believed distributor B's distribution was within the United States and Canada, but that was in fact not the case. In that case, there would be erroneously reliance on the statement of trusted issuance. For this reason, it could be desirable to restrict the issuance of a statement of trusted issuance.

In an exemplary embodiment, the trust root, for example, publisher A, may restrict the right to issue a statement of trusted issuance to certain agents or agents meeting certain criteria, including, for example, criteria of trustworthiness. In a further exemplary embodiment, an agent may decline to rely on a statement of trusted issuance issued by another. The decision whether to rely on a statement may be based on some criteria or the agent may decide not to rely on such statements generally. In a still further exemplary embodiment, agents may be prohibited from relying on a statement of trusted issuance issued by certain other agents. In another exemplary embodiment, agents would have the option of relying on a statement of trusted issuance or could "bypass" the statement, and verify all or part of a rights expression chain. In yet another exemplary embodiment, agents may be required to rely on a statement of trusted issuance, wherein an agent would not be allowed to verify all or part of a rights expression chain or otherwise access or inspect the rights expression chain.

In addition to rights expression, the exemplary embodiments also can be used for the authorization determination of other statements or expressions. For example, consider the scenario of A being a manufacturer of branded goods, B being one of its exclusive distributors within a country, C being one of its regional distributors within B's country, and D being a retailer within C's territory. A proof of purchase certificate must be presented in order to service goods manufactured by A. D can issue a proof of purchase. However, its authorization needs to be traced back from C to B to A. Advantageously, if the proof of purchase certificate issued by D includes a statement of trusted issuance rooted with manufacturer A, as described with respect to the exemplary embodiments, the verification of the authorization for this proof of purchase certificate can be simplified and expedited.

The exemplary embodiments can include a language for statements of trusted issuance (also called an issuance chain verification signal language), which could be compatible with the ISO MPEG REL. Thus, terminology (such as terms, definitions, symbols, abbreviated terms, namespaces and conventions) can be as used in the ISO MPEG REL. In addition, Clause 3 (Terms, definitions, symbols, and abbreviated terms) and Clause 4 (Namespaces and Conventions) from the ISO MPEG REL are incorporated by reference herein. The syntax for an issuance chain verification signal language is given by the following exemplary schema:

```
<?xml version="1.0" encoding="UTF-8"?>
<xsd:schema targetNamespace="urn:mpeg:mpeg21:2003:01-REL-SX-NS"
xmlns:sx="urn:mpeg:mpeg21:2003:01-REL-SX-NS"
xmlns:r="urn:mpeg:mpeg21:2003:01-REL-R-NS"
xmlns:xsd="http://www.w3.org/2001/XMLSchema"
elementFormDefault="qualified"
attributeFormDefault="unqualified">
    <xsd:import namespace="urn:mpeg:mpeg21:2003:01-REL-R-NS"
schemaLocation="rel-r.xsd"/>
    <xsd:element name="issuanceChainVerificationThrough" block="#all"
final="#all">
        <xsd:complexType>
            <xsd:sequence>
                <xsd:element name="h" minOccurs="0"
maxOccurs="unbounded">
                    <xsd:complexType>
                        <xsd:sequence>
                            <xsd:element ref="r:trustRoot" minOccurs="0"
maxOccurs="unbounded"/>
                        </xsd:sequence>
                    </xsd:complexType>
                </xsd:element>
            </xsd:sequence>
        </xsd:complexType>
    </xsd:element>
</xsd:schema>
```

Figure 6:
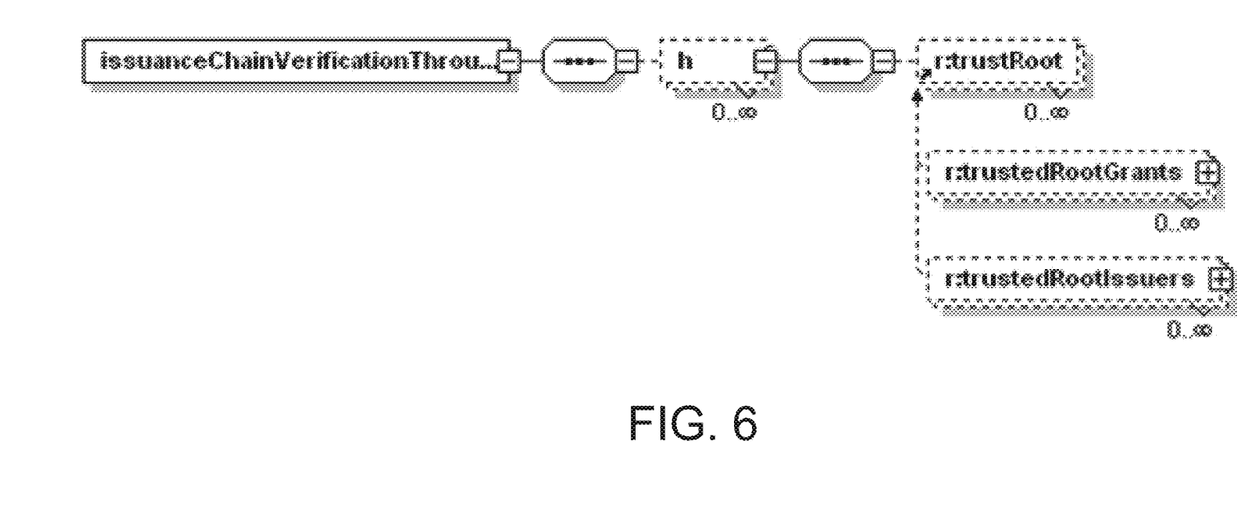
FIG. 6 shows an exemplary issuance chain verification signal.

An exemplary Issuance Chain Verification Signal, as further illustrated in FIG. 6, is given by:

```
<sx:issuanceChainVerificationThrough>
    <sx:h>
        <r:trustedRootIssuers>
            <r:keyHolder>
                <r:info>
                    <dsig:KeyValue>
                        <dsig:RSAKeyValue>
                            <dsig:Modulus>AliM4ccyzA==</dsig:Modulus>
                            <dsig:Exponent>AQABAA==</dsig:Exponent>
                        </dsig:RSAKeyValue>
                    </dsig:KeyValue>
                </r:info>
            </r:keyHolder>
        </r:trustedRootIssuers>
    </sx:h>
</sx:issuanceChainVerificationThrough>
```

Exemplary Semantics for the Issuance Chain Verification Signal Language are given by:

Let l be an r:License. Let i be an sx:issuanceChainVerificationThrough that applies to l. Then the number of i/sx:h children of i shall be equal to the number of l/r:grant and l/r:grantGroup children of l, and the semantics of i is that, for each k from 1 to the number of i/sx:h children of i, the permission to include the $k^{th}$ l/r:grant or l/r:grantGroup in l has been verified with respect to each of the trust roots identified by an r:trustRoot child of the $k^{th}$ i/sx:h child of i.

An exemplary Issuance Chain Verification Signaling ISO MPEG REL Profile is given by:
To apply an sx:issuanceChainVerificationThrough i to an r:License l,
1. i shall appear as a child of l/r:otherInfo and
2. for each l/r:issuer where l/r:issuer/dsig:Signature is present, that dsig:Signature shall not exclude i from the scope of the signature (note that by default i will be included in any signature over the License that uses the enveloped signature transform or license transform).

An exemplary Property for Certifying Issuance Chain Verification Signalers is given by:
The URI urn:standards-organization:2004:icvs (for use with sx:propertyUri) defines a property for certifying that a Principal's issuance chain verification signals are to be trusted.

An exemplary Signaler Processing Model is given by:
Let p be an r:Principal. Let l be an r:License including an l/r:otherInfo/sx:issuanceChainVerificationThrough i. Then, before the Principal identified by p signs l, the Principal identified by p shall verify, for each k from 1 to the number of i/sx:h children of i, for each j from 1 to the number of i/sx:h/r:trustRoot children of the $k^{th}$ i/sx:h child of i, that there is an authorization proof for the authorization request (p, r:issue, h, v, S, L, R) where h is the $k^{th}$ l/r:grant or l/r:grantGroup in l, R is the $j^{th}$ i/sx:h/r:trustRoot child of the $k^{th}$ i/sx:h child of i, and v, S, and L are chosen accurately.

An exemplary Signal Interpreter Processing Model is given by:
A conventional rights interpreter attempting to verify if some Principal identified by an r:Principal p was permitted to include some r:Grant or r:GrantGroup h in a License he issued could potentially encounter some difficulties: the Licenses permitting that inclusion (for instance, those including an r:issue element) or the historical circumstances of that inclusion (for instance, any fees that were paid or counts that were consumed) might not be available to the rights interpreter. However, such information may have been available to a rights interpreter when the License was issued. If that rights interpreter adds an issuance chain verification signal to the License, a rights interpreter that has an issuance chain verification signal interpreter can later read that issuance chain verification signal in lieu of verifying the issuance chain a second time.
For instance, instead of verifying that the inclusion of some r:Grant or r:GrantGroup h in a License was authorized with respect to some trust root R, the issuance chain verification signal interpreter can instead:
1. verify that the set of r:Grant elements indicated by at least one of the trust roots corresponding to h (according to the issuance chain verification signal) is some subset of the r:Grant elements indicated by R and
2. verify that the Principal who issued the License is permitted to possess the property defined by urn:standards-organization:2004:icvs.

Figure 7:
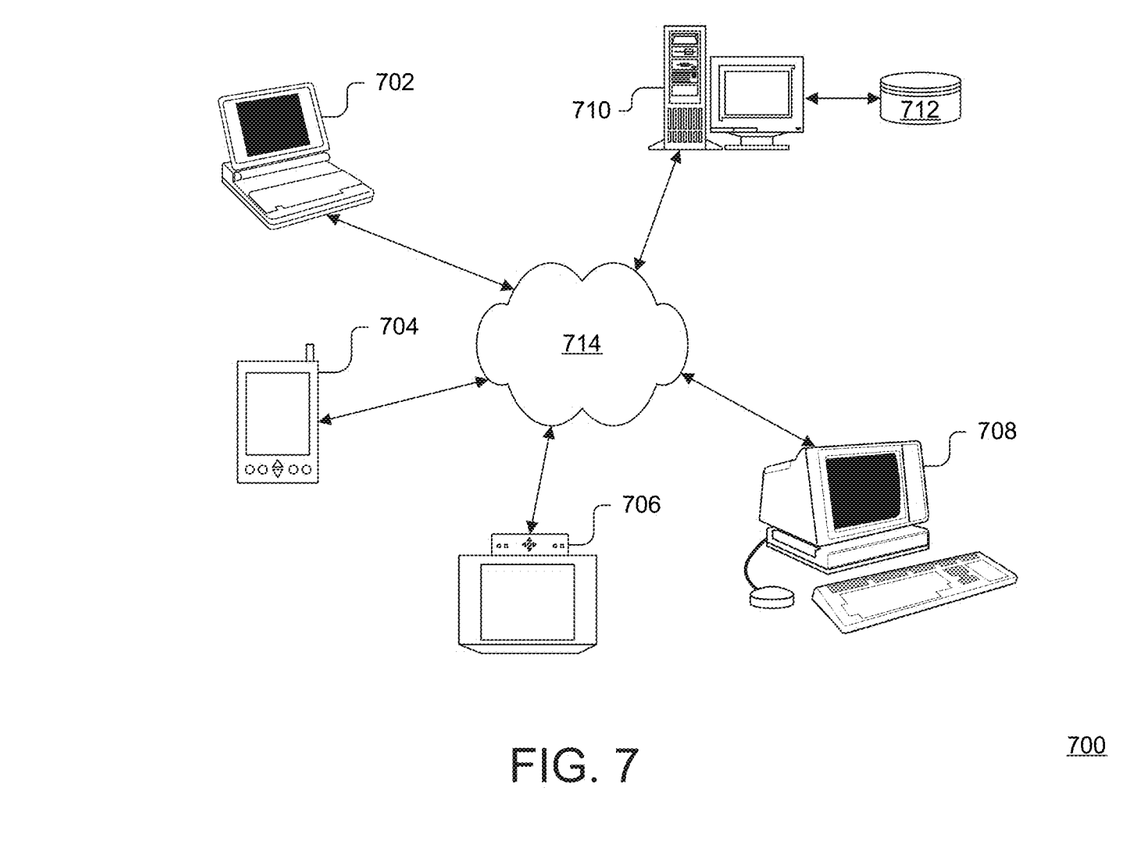
FIG. 7 shows an exemplary system for verifying authorized issuance of a rights expression.

FIG. 7 shows an exemplary system 700 for verifying authorized issuance of a rights expression in accordance with the exemplary embodiments of FIGS. 1-6. In FIG. 7, the exemplary system 700 can include one or more devices 702-708, a content server 710, and content database 712, coupled together via a communications network 714.

The above-described devices and subsystems of the exemplary embodiments of FIGS. 1-7 can include, for example, any suitable servers, workstations, PCs, laptop computers, PDAs, Internet appliances, handheld devices, cellular telephones, wireless devices, other devices, and the like, capable of performing the processes of the exemplary embodiments of FIGS. 1-7. The devices and subsystems of the exemplary embodiments of FIGS. 1-7 can communicate with each other using any suitable protocol and can be implemented using one or more programmed computer systems or devices.

One or more interface mechanisms can be used with the exemplary embodiments of FIGS. 1-7, including, for example, Internet access, telecommunications in any suitable form (e.g., voice, modem, and the like), wireless communications media, and the like. For example, the communications network 714 can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the exemplary embodiments of FIGS. 1-7 are for exemplary purposes, as many variations of the specific hardware used to implement the exemplary embodiments are possible, as will be appreciated by those skilled in the relevant art(s). For example, the functionality of one or more of the devices and subsystems of the exemplary embodiments of FIGS. 1-7 can be implemented via one or more programmed computer systems or devices.

To implement such variations as well as other variations, a single computer system can be programmed to perform the special purpose functions of one or more of the devices and subsystems of the exemplary embodiments of FIGS. 1-7. On the other hand, two or more programmed computer systems or devices can be substituted for any one of the devices and subsystems of the exemplary embodiments of FIGS. 1-7. Accordingly, principles and advantages of distributed processing, such as redundancy, replication, and the like, also can be implemented, as desired, to increase the robustness and performance of the devices and subsystems of the exemplary embodiments of FIGS. 1-7.

The devices and subsystems of the exemplary embodiments of FIGS. 1-7 can store information relating to various processes described herein. This information can be stored in one or more memories, such as a hard disk, optical disk, magneto-optical disk, RAM, and the like, of the devices and subsystems of the exemplary embodiments of FIGS. 1-7. One or more databases of the devices and subsystems of the exemplary embodiments of FIGS. 1-7 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 1-7 can include appropriate data structures for storing data collected and/or generated by the processes of the devices and subsystems of the exemplary embodiments of FIGS. 1-7 in one or more databases thereof.

All or a portion of the devices and subsystems of the exemplary embodiments of FIGS. 1-7 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. Further, the devices and subsystems of the exemplary embodiments of FIGS. 1-7 can be implemented on the World Wide Web. In addition, the devices and subsystems of the exemplary embodiments of FIGS. 1-7 can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present invention can include software for controlling the devices and subsystems of the exemplary embodiments of FIGS. 1-7, for driving the devices and subsystems of the exemplary embodiments of FIGS. 1-7, for enabling the devices and subsystems of the exemplary embodiments of FIGS. 1-7 to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the invention. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present invention can be distributed for better performance, reliability, cost, and the like.

As stated above, the devices and subsystems of the exemplary embodiments of FIGS. 1-7 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

In the context of the exemplary embodiments, an AGENT can include an entity that can act, possibly on behalf of another entity and/or according to a set of rules (examples of agents are hardware devices, integrated circuits, firmware modules, software modules, software systems, humans, organizations, services, smart cards, and seeing-eye dogs). An ASSET can include an entity, quality, event, state, concept, substance, or anything else referred to by a noun and possibly of some value (examples of assets are books, e-books, videos, services, web services, companies, security levels, domain names, e-mail addresses, football games, messages, and rights). A CERTIFICATE can include a "rights expression". A CONDITION can include a limitation on some claim made in an expression or statement (examples are times of validity, territories of applicability, numbers of times the claim can be relied on, and situations in which the claim holds). To ISSUE can include an act of making the claims in an expression or statement and standing behind those claims. METARIGHTS can include rights with respect to other rights. RIGHTS can include actions or attributes an agent is permitted to take possibly with respect to an asset or to other rights (examples of actions are walk and shutdown; examples of actions with respect to assets are consumption actions such as play and print, modification actions such as edit and append, distribution actions, such as copy and move, and service actions such as requestService and sendMessage; examples of actions with respect to other rights are issue and revoke; examples of attributes are name, address, color, securityLevel, employee, relative, friend, domain, graduate, and certifiedRepairFacility; examples of attributes with respect to assets are author and distributor; examples of attributes with respect to other rights are issuanceChainVerifier, certificateAuthority, and trustedIssuer). RIGHTS DERIVATION can include issuing a statement or expression such as a rights expression whose issuance was permitted within another rights expression or a trust root (the issued statement or rights expression is called the derived statement or derived rights expression and it is said to be derived from the rights expression or trust root that permitted its issuance). A RIGHTS EXPRESSION can include an expression including a claim that rights are granted (examples of rights expression languages include the ISO MPEG REL, the eXtensible rights Markup Language, the Contract Expression Language from the Content Reference Forum (see http://www.crforum.org/), the Open Digital Rights Language from IPRSystems, OMA DRM 2.0 Specification Rights Expression Language, the Security Assertion Markup Language from the Organization for the Advancement of Structured Information Standards (OASIS), the eXtensible Access Control Markup Language from OASIS, X.509, SPKI, the Rights Management and Protection Information from the TV Anytime Forum, and Copy Control Information bits). To SIGN can include creating something that gives confidence that an expression or statement that a party issues actually is issued by said party. A STATEMENT OF TRUSTED ISSUANCE can include a statement including a claim that an issuance was authorized according to some trust root or rights expression. A TRUST ROOT can include an encapsulation of rights that are assumed to be authorized.

Although the exemplary embodiments are described in terms of use of a rights expression, and distribution and use of digital works, the exemplary embodiments are not restricted to rights expressions, and digital works. Accordingly, the benefits associated with not having to process all the data in a chain of data and the other advantages of the exemplary embodiments can apply to other kinds of computing applications. For example, in addition to rights expressions, the exemplary embodiments can be used in connection with other statements or expressions, which can benefit from an efficient method to determine authorization, such as proof of transaction, proof of purchase, proof of certification, proof of identity, proof of approval, statement of fact, business intent, business contract, rules, policies, and the like.

While the present invention have been described in connection with a number of exemplary embodiments, and implementations, the present invention is not so limited, but rather covers various modifications, and equivalent arrangements, which fall within the purview of the appended claims.

What is claimed is:

1. A computer-implemented method executed by one or more computing devices for verifying a rights expression chain which is represented by digital data, the method comprising:

determining, by at least one of the one or more computing devices, whether a rights expression in the rights expression chain is associated with a statement of trusted issuance, the statement being distinguishable from the rights expression chain;

determining, by at least one of the one or more computing devices, whether information included in the statement of trusted issuance corresponds to a trust root;

determining, by at least one of the one or more computing devices, whether issuance of the statement of trusted issuance was authorized at the time the statement of trusted issuance was issued; and verifying, by at least one of the one or more computing devices, that performing a protected operation is allowed without tracing the rights expression chain to verify the trust root, based at least in part on the rights expression being a rights expression associated with a statement of trusted issuance, the statement being distinguishable from the right expression chain, the information included in the statement of trusted issuance corresponding to a trust root, and the issuance of the statement of trusted issuance being authorized at the time the statement of trusted issuance was issued, otherwise, verifying, by at least one of the one or more computing devices, that performing a protected operation is allowed by tracing the rights expression chain to verify the trust root.

2. The method of claim 1, wherein the statement of trusted issuance specifies an entity associated therewith, and further comprising determining whether the entity associated with the statement of trusted issuance is a trusted entity.

3. The method of claim 1, wherein the statement of trusted issuance specifies a grant associated therewith, and further comprising determining whether the grant associated with the statement of trusted issuance is a trusted grant.

4. The method of claim 1, wherein the statement of trusted issuance specifies a chain-ancestor rights expression associated therewith, and further comprising determining whether the issuance of the chain-ancestor rights expression associated with the statement of trusted issuance is authorized.

5. The method of claim 1, wherein a single entity issued the statement of trusted issuance and the rights expression associated with the statement of trusted issuance.

6. The method of claim 1, wherein the rights expression associated with the statement of trusted issuance comprises at least one of a proof of entitlement to a digital work, a proof of entitlement to a service, a proof of entitlement to a resource, a proof of transaction, a proof of purchase, a proof of certification, a proof of identity, a proof of approval, a statement of fact, a statement or expression of business intent, a statement or expression of a business contract, or a statement or expression of rules or policies.

7. An apparatus for verifying a rights expression chain which is represented by digital data, the apparatus comprising:

one or more processors; and one or more memories operatively coupled to at least one of the one or more processors and having instructions stored thereon that, when executed by at least one of the one or more processors, cause at least one of the one or more processors to:

determine whether a rights expression in the rights expression chain is associated with a statement of trusted issuance, the statement being distinguishable from the rights expression chain;

determine whether information included in the statement of trusted issuance corresponds to a trust root;

determine whether issuance of the statement of trusted issuance was authorized at the time the statement of trusted issuance was issued; and verify that performing a protected operation is allowed without tracing the rights expression chain to verify the trust root, based at least in part on the rights expression being a rights expression associated with a statement of trusted issuance, the statement being distinguishable from the right expression chain, the information included in the statement of trusted issuance corresponding to a trust root, and the issuance of the statement of trusted issuance being authorized at the time the statement of trusted issuance was issued, otherwise, verify that performing a protected operation is allowed by tracing the rights expression chain to verify the trust root.

8. The apparatus of claim 7, wherein the statement of trusted issuance specifies an entity associated therewith, and wherein at least one of the one or more memories has further instructions stored thereon that, when executed by at least one of the one or more processors, cause at least one of the one or more processors to determine whether the entity associated with the statement of trusted issuance is a trusted entity.

9. The apparatus of claim 7, wherein the statement of trusted issuance specifies a grant associated therewith, and wherein at least one of the one or more memories has further instructions stored thereon that, when executed by at least one of the one or more processors, cause at least one of the one or more processors to determine whether the grant associated with the statement of trusted issuance is a trusted grant.

10. The apparatus of claim 7, wherein the statement of trusted issuance specifies a chain-ancestor rights expression associated therewith, and wherein at least one of the one or more memories has further instructions stored thereon that, when executed by at least one of the one or more processors, cause at least one of the one or more processors to determine whether the issuance of the chain-ancestor rights expression associated with the statement of trusted issuance is authorized.

11. The apparatus of claim 7, wherein a single entity issued the statement of trusted issuance and the rights expression associated with the statement of trusted issuance.

12. The apparatus of claim 7, wherein the rights expression associated with the statement of trusted issuance comprises at least one of a proof of entitlement to a digital work, a proof of entitlement to a service, a proof of entitlement to a resource, a proof of transaction, a proof of purchase, a proof of certification, a proof of identity, a proof of approval, a statement of fact, a statement or expression of business intent, a statement or expression of a business contract, or a statement or expression of rules or policies.

13. At least one non-transitory computer-readable medium storing computer-readable instructions that, when executed by one or more computing devices, cause at least one of the one or more computing devices to:

determine whether a rights expression in the rights expression chain is associated with a statement of trusted issuance, the statement being distinguishable from the rights expression chain;

determine whether information included in the statement of trusted issuance corresponds to a trust root;

determine whether issuance of the statement of trusted issuance was authorized at the time the statement of trusted issuance was issued; and verify that performing a protected operation is allowed without tracing the rights expression chain to verify the trust root, based at least in part on the rights expression being a rights expression associated with a statement of trusted issuance, the statement being distinguishable from the right expression chain, the information included in the statement of trusted issuance corresponding to a trust root, and the issuance of the statement of trusted issuance being authorized at the time the statement of trusted issuance was issued, otherwise, verify that performing a protected operation is allowed by tracing the rights expression chain to verify the trust root.

14. The at least one non-transitory computer-readable medium of claim 13, wherein the statement of trusted issuance specifies an entity associated therewith, and storing further instructions that, when executed by one or more computing devices, cause at least one of the one or more computing devices to determine whether the entity associated with the statement of trusted issuance is a trusted entity.

15. The at least one non-transitory computer-readable medium of claim 13, wherein the statement of trusted issuance specifies a grant associated therewith, and storing further instructions that, when executed by one or more computing devices, cause at least one of the one or more computing devices to determine whether the grant associated with the statement of trusted issuance is a trusted grant.

16. The at least one non-transitory computer-readable medium of claim 13, wherein the statement of trusted issuance specifies a chain-ancestor rights expression associated therewith, and wherein storing further instructions that, when executed by one or more computing devices, cause at least one of the one or more computing devices to determine whether the issuance of the chain-ancestor rights expression associated with the statement of trusted issuance is authorized.

17. The at least one non-transitory computer-readable medium of claim 13, wherein a single entity issued the statement of trusted issuance and the rights expression associated with the statement of trusted issuance.

18. The at least one non-transitory computer-readable medium of claim 13, wherein the rights expression associated with the statement of trusted issuance comprises at least one of a proof of entitlement to a digital work, a proof of entitlement to a service, a proof of entitlement to a resource, a proof of transaction, a proof of purchase, a proof of certification, a proof of identity, a proof of approval, a statement of fact, a statement or expression of business intent, a statement or expression of a business contract, or a statement or expression of rules or policies.

* * * * *